Sept. 11, 1928.　　　　B. REICHELT　　　　1,683,805
AIRPLANE
Filed Oct. 22, 1927　　2 Sheets-Sheet 1
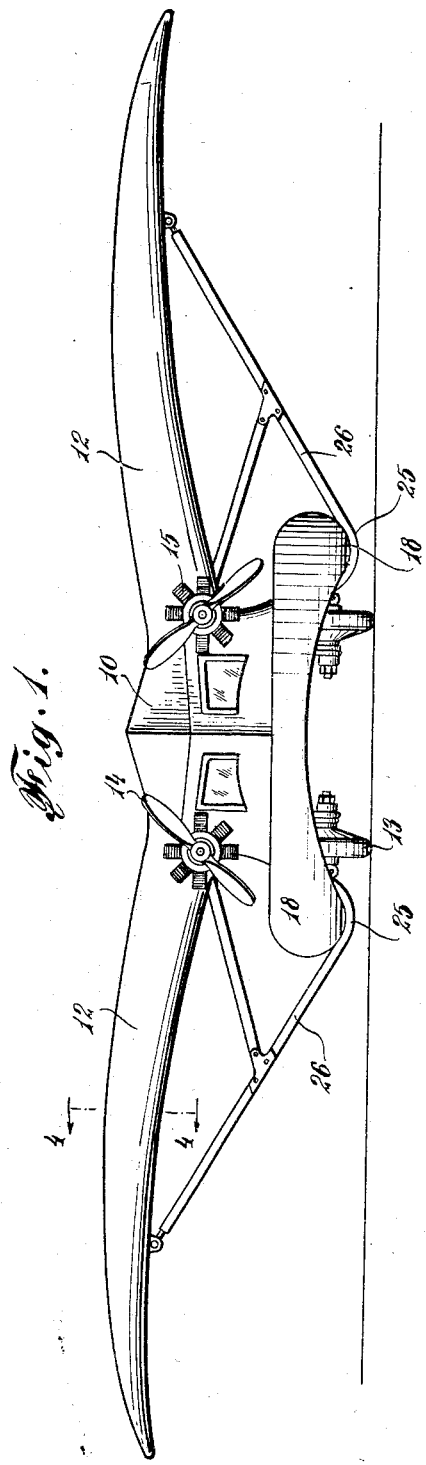
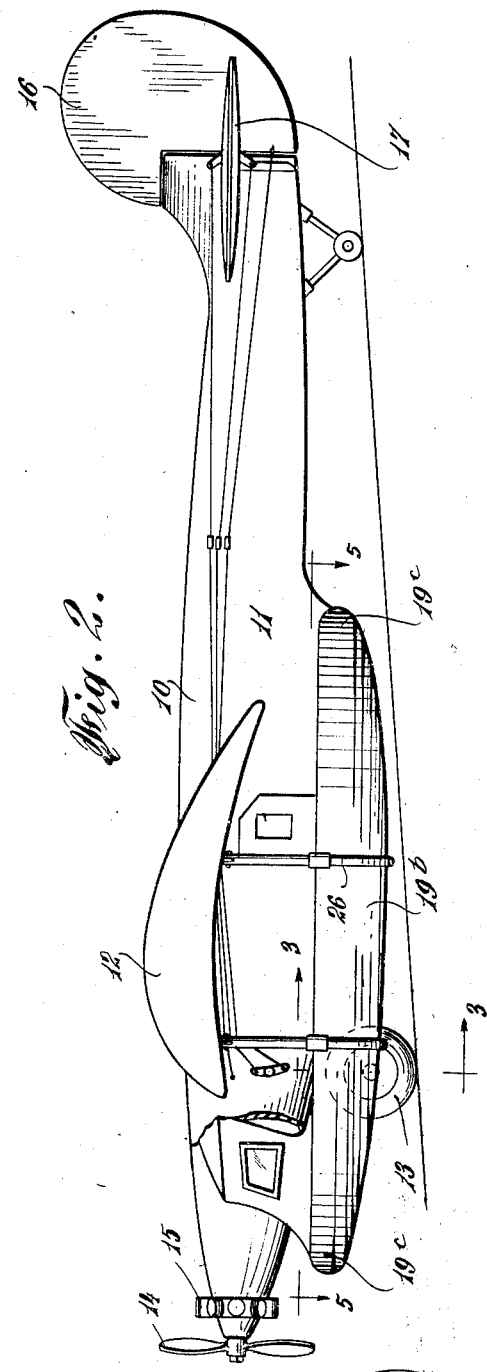

Sept. 11, 1928.                B. REICHELT                    1,683,805
                                 AIRPLANE
                             Filed Oct. 22, 1927            2 Sheets-Sheet 2
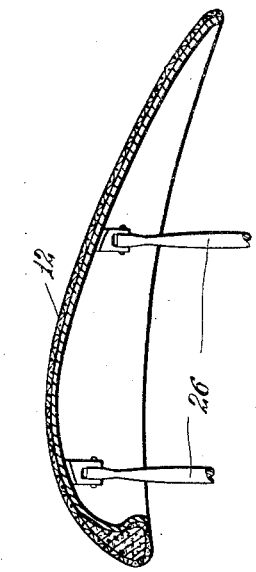
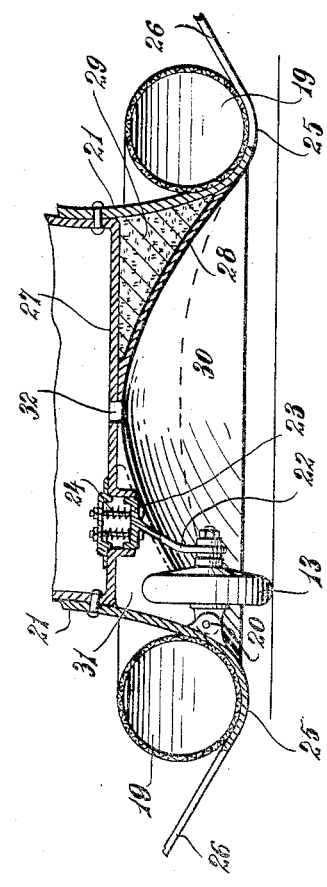
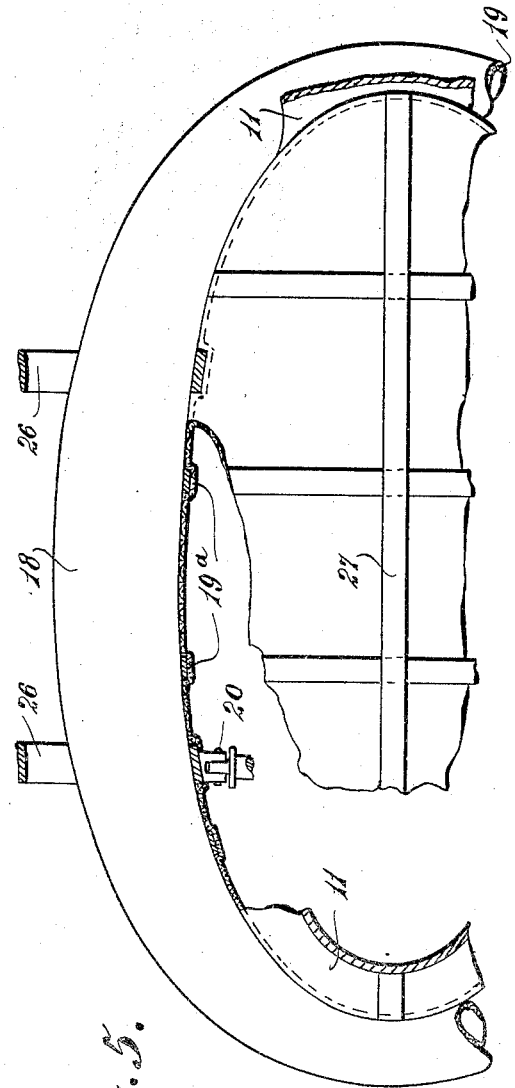

Patented Sept. 11, 1928.

1,683,805

UNITED STATES PATENT OFFICE.

BRUNO REICHELT, OF NUTLEY, NEW JERSEY.

AIRPLANE.

Application filed October 22, 1927. Serial No. 227,939.

This invention relates to airplanes, and has for one of its objects the provision of an improved airplane in which flotation means are provided that permits said airplane to safely alight on water, and to remain afloat thereon as long as may be desired, and to easily take off therefrom without interference or hindrance by the water.

A further object of the invention is to provide an improved airplane having a flotation device positioned thereon to produce a balanced effect in the normal operation of the airplane, and to act as a parachute to retard an unintended drop of the airplane and act as a stabilizer permitting said airplane to alight safely whether on land or on water.

A still further object of the invention is to provide an improved flotation device of annular form, of simplified and compact construction, and having coaction with the body of an airplane, or the like, for highest efficiency in use.

Other objects will in part be obvious and in part pointed out hereinafter.

Accordingly, one embodiment of the invention is illustrated in the drawings, and described herein, the scope of said invention being indicated in the following claims.

In the drawings, Fig. 1 is a front view of an airplane embodying the invention;

Fig. 2 is a side view of same;

Fig. 3 is a sectional view taken on line 3—3 of Fig. 2 on one side of said airplane and along a different line at the other side thereof;

Fig. 4 is a sectional detail view of a wing taken on line 4—4 of Fig. 1;

Fig. 5 is a sectional view in plan taken on line 5—5 of Fig. 2, with parts broken away.

Referring in detail to the drawing, 10 denotes an airplane embodying the invention, it being understood however, that the invention can be used in conjunction with any type of aircraft. Said airplane is seen to comprise a fuselage 11, having wings 12, a landing gear 13, a propeller 14 driven by an engine 15 at the forward end of said airplane, and a steering vane and balancing wings 16 and 17 at the tail end thereof.

Mounted in any suitable relation on the airplane, preferably below said fuselage 11, and extending into proximity to said engine 15 is a flotation device 18. Said flotation device is of relatively considerable size and of sufficient buoyancy so as to safely sustain the weight of the airplane should the latter be compelled to alight on the water, and it is centrally arranged with respect to the wings 12, and so positioned as to the center of gravity of the airplane as to support same in safely balanced position. The flotation device is of generally flat form to lend itself to compact arrangement along the airplane and to offer as little resistance to the air as possible.

Said flotation device 18 is of light construction, so as not to detract from the lifting power of the airplane, and it is preferably in permanently inflated condition to be ready to function instantaneously. The flotation device may accordingly include an air chamber 19 made of any suitable material, as, for example rubber, that is properly re-enforced by duralumin bars 19$^a$, or the like.

By making the chamber 19 of annular construction, it may surround the landing gear 13 and so permit of maximum compactness as so constructed said chamber is preferably of smaller size or diameter at the front and rear end portions 19$^c$ than at the side portions 19$^b$ to preserve a stream line arrangement and reduce air resistance. While the landing gear may be mounted in any manner that might be desired, it will be seen specifically that same is pivotally secured at 20 to the downward extending members or plates 21 at the sides of the fuselage, while braces 22 are connected to sliding heads 23 which act against shock absorbing springs 24 for safety in the landing gear.

The members 21 extend through and underneath the chamber 19 to provide an annular seat 25 therefor, while wing braces 26 connected to the lower portions of said members at said seat complete the supporting structure for said chamber. To these parts the chamber is properly secured in a suitable manner.

Preferably the flotation device 18 is so formed as to constitute a parachute that is permanently open, and serves to break the fall of the airplane, as in the event the engine goes dead, or peculiar air currents are encountered, and to permit the airplane to descend in safe and balanced position. For this purpose, the plates 21 may have continuous contact at their upper ends with the fuselage bottom 27 at the landing gear, while at other parts a plate 28 extends in curved form from adjacent said seat 25 to the fuselage bottom 27 at the central longitudinal plane of the aircraft. The space between plate 28 and the fuselage bottom may be filled with any suitable light material 29 if desired. Thus a large downward opening chamber 30 is formed within the flotation device, and containing the landing gear in recesses 31 of said chamber.

To permit an airplane that is sustained by said flotation device to readily take off, and prevent the chamber 30 from developing a reduced air pressure and a consequent suction, through leakage of air therefrom, or the like, a vent 32 is provided that may be controlled by a valve, or be permanently open. In either event, the action of chamber 30 as a parachute will not be affected thereby, and said chamber may be used in an obvious manner to increase the buoyancy of the flotation device, and in any event to permit an unretarded take off.

I claim:

1. An aircraft having a parachute chamber at the bottom thereof, and a flotation member at the lower edge of said chamber and surrounding same, said chamber being vented.

2. An aircraft having an annular flotation member smaller at the front end thereof than at the sides.

3. An aircraft having an annular flotation member smaller at the front and rear ends thereof than at the sides.

4. An aircraft having a fuselage, an engine at an end thereof, and an annular flotation member under said fuselage surrounding same and extending into proximity to said engine for balancing action.

5. An aircraft having a fuselage, wings, an annular flotation member, and wing braces supporting said member.

6. An aircraft having a fuselage, wings, a flotation member, said fuselage having downward extending portions engaging said member, and wing braces connected to said portions, and coacting with the latter to support said member.

Signed at New York in the county of New York and State of New York this seventeenth day of October, A. D. 1927.

BRUNO REICHELT.